(12) United States Patent
Miller

(10) Patent No.: US 6,200,069 B1
(45) Date of Patent: Mar. 13, 2001

(54) HOVERCRAFT WORK PLATFORM

(76) Inventor: George Austin Miller, 2732 Gaston Ave. #739, Dallas, TX (US) 75226

( * ) Notice: Subject to any disclaimer, the term of this patent is extended or adjusted under 35 U.S.C. 154(b) by 0 days.

(21) Appl. No.: 09/357,705

(22) Filed: Jul. 20, 1999

(51) Int. Cl.[7] .......................... E02B 17/08; E02D 29/00; B60V 1/00; B60V 3/00
(52) U.S. Cl. .......................... 405/196; 405/203; 180/116; 114/265
(58) Field of Search .......................... 405/196, 197, 405/198, 199, 200, 203, 217; 180/116; 114/264, 285, 67 A

(56) References Cited

U.S. PATENT DOCUMENTS

| | | |
|---|---|---|
| 3,327,668 | 6/1967 | Schultz . |
| 3,537,412 | 11/1970 | Henderson . |
| 3,575,005 | 4/1971 | Sumner . |
| 3,592,154 | 7/1971 | Holmes . |
| 3,662,853 * | 5/1972 | Love ...................................... 180/121 |
| 3,683,629 | 8/1972 | Paull et al. . |
| 3,693,729 * | 9/1972 | Blurton et al. ........................ 405/217 |
| 3,783,627 * | 1/1974 | Blurton et al. ........................ 405/217 |
| 3,822,558 * | 7/1974 | Blankenship .......................... 180/116 |
| 3,844,126 * | 10/1974 | Blurton et al. ........................ 405/217 |
| 3,908,784 * | 9/1975 | Blurton et al. ........................ 180/119 |
| 4,583,881 * | 4/1986 | Steele .................................... 405/198 |
| 4,813,814 * | 3/1989 | Shibuta et al. ........................ 405/198 |
| 5,522,470 | 6/1996 | Stiegler et al. . |
| 5,833,396 | 11/1998 | Thomas . |
| 5,871,061 * | 2/1999 | Ashton .................................. 180/116 |

* cited by examiner

Primary Examiner—Eileen D. Lillis
Assistant Examiner—Gary S. Hartmann

(57) ABSTRACT

A jack up work platform is recited. The work platform comprises a hovercraft vessel outfitted with several jack up legs. The hovercraft can traverse environmentally sensitive terrain such a brackish and freshwater marshes without the need to dig canals that may cause or exacerbate salt water intrusion. Once the drilling or exploration site is reached, the jack up legs may be lowered, lifting the work platform above the surface. Once the vessel is secured on the legs, it may be used like a conventional oil field work platform for drilling, exploration, or construction jobs for which other work platforms or vessels are typically used. The deck of the hovercraft may serve as the work platform or the deck may be provided with a cantilevered work platform extension. The hovercraft will preferably be provided with typical oil field heavy machinery such as a crane for assembly of the legs, and drill stem as well as for work on other structures.

15 Claims, 4 Drawing Sheets

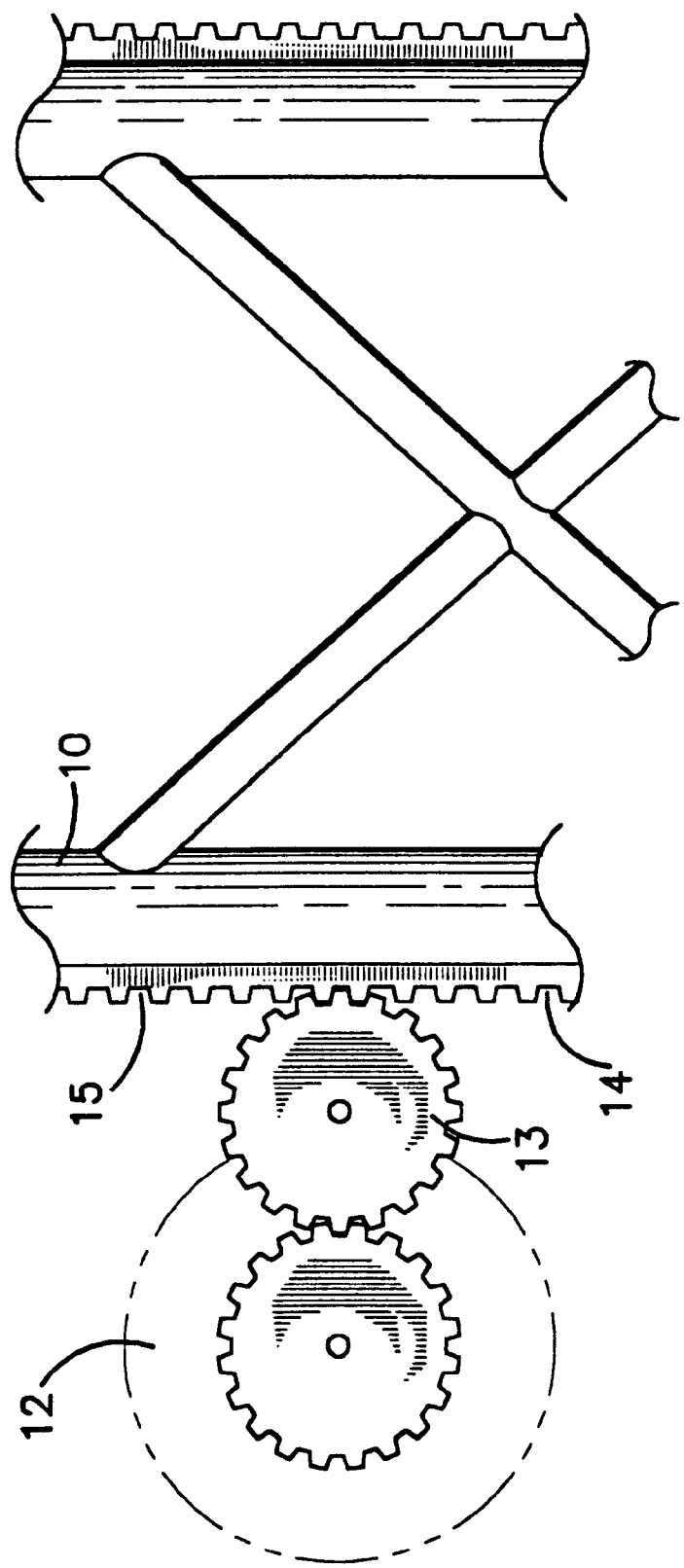

HOVERCRAFT WORK PLATFORM

BACKGROUND OF THE INVENTION

1. Field of the Invention

The invention relates to marine work platforms in general, and to work platforms especially suited for use in a marsh environment in particular.

2. Prior Art

There are many coastal marshlands in the United States that cover rich petroleum reserves. These marshlands are home to a great diversity of wildlife. They serve as the nursery for a wide variety of commercially significant fish and shellfish, and they are the home to numerous mammals, reptiles, amphibians, and birds. Along the coast of the Gulf of Mexico, these marshes also provide wintering grounds to millions of migratory waterfowl. Some of the creatures that live in the marsh, such as the ringed sawback turtle, are endangered, and one of the principle difficulties they face is the loss of habitat.

Many of these marshes, and some of the most productive in terms of wildlife, are brackish. They exist in a delicate balance between freshwater draining from the land and saltwater entering from the sea. A change in this balance, particularly an increase in saltwater, can have disastrous results. An increase in salinity can kill the vegetation that thrive in the brackish waters. This vegetation is the bedrock on which the entire food chain of the marsh depends. As it dies, the marsh is no longer able to support life, and a vibrant ecosystem can disappear in an astonishingly short period of time.

The loss of the marsh grass can also threaten the physical existence of the marsh. Frequently, the only structure holding the underlying soil in place is the grass. As it dies, the tidal flow and ocean storms are able to carry away the fine silt that makes up the marsh. Thus, an influx of saltwater can literally erase an entire marshland ecosystem. Although described in terms of a brackish marsh, the foregoing explanation is equally applicable to freshwater marshes.

The exploitation of the petroleum reserves lying below the marshes is often a direct cause of such saltwater intrusion. To extract these reserves, a well must be drilled. This requires a work platform on which the drilling structure may be supported. On dry land, a platform may be erected on the ground, and the necessary equipment may simply be trucked to the site. In the open ocean, a work platform may be floated to the drill site and raised using a jack-up mechanism such as that illustrated in U.S. Pat. No. 5,833,396, which is hereby incorporated by reference in its entirety to the extent its teachings are not contrary to those contained herein.

Drilling in the marsh creates a unique set of difficulties. The land is frequently insufficiently solid to support trucks, which prevents the necessary equipment from being driven to the site. Also, the water in the marsh is too shallow to allow the equipment to be floated to the drill site, and the cost is too high and the equipment is too heavy for all the necessary equipment to be transported by helicopter or other aircraft. The solution most frequently employed is to dig canals in the marsh in order to create water deep enough to float in the drilling equipment. In addition to the other difficulties discussed below, this is a substantial expense in marsh drilling.

Probably the most significant drawback to the use of canals is that they provide a direct passage for saltwater to enter the marsh, with the environmentally disastrous results described above. For this reason, regulations have been passed in the United States restricting the creation of canals in the remaining coastal marshes. This creates a transportation problem for those wishing to drill in the marshes which may preclude the drilling of some wells altogether. Similar, difficulties can arise in other sensitive environments such as arctic tundra or any other location where canals may prove harmful. Therefore, a work platform meeting the following objectives is desired.

OBJECTS OF THE INVENTION

It is an object of the invention to provide a work platform which may be moved across the marsh without the need for canals.

It is another object of the invention to provide a work platform which can be used as a drilling structure in the marsh.

It is another object of the invention to provide a structure which will allow a petroleum well to be drilled in the marsh without incurring the expense of digging a canal.

It is another object of the invention to allow a petroleum well to be drilled in the marsh without creating a passage for saltwater to enter the marsh.

SUMMARY OF THE INVENTION

The invention comprises a hovercraft having a jack-up structure. The deck of the hovercraft serves as the work platform. In a hovercraft, the vessel rides on a cushion of air. It can pass over the grasslands of the marsh as easily as the shallow water. The vessel will be able to travel through the marsh directly to the drill site. Once there, the jack-up structure will be extended, and the vessel raised in the same way as a conventional jack-up rig. From the raised deck of the hovercraft, the drilling or other exploration or production operations can be conducted. Additional equipment and workmen can be ferried back and forth to the drill site with other hovercraft. Hovercraft can even be used to lay a pipeline to carry the oil or gas to land, should petroleum be discovered. All of the foregoing can be conducted without having to dig a canal in the marsh.

BRIEF DESCRIPTION OF THE FIGURES

FIG. 4 is a side view illustrating one embodiment in which the motor engages the teeth on the jack up legs inside the jackhouse.

DETAILED DESCRIPTION OF THE BEST MODE

Figure 1:
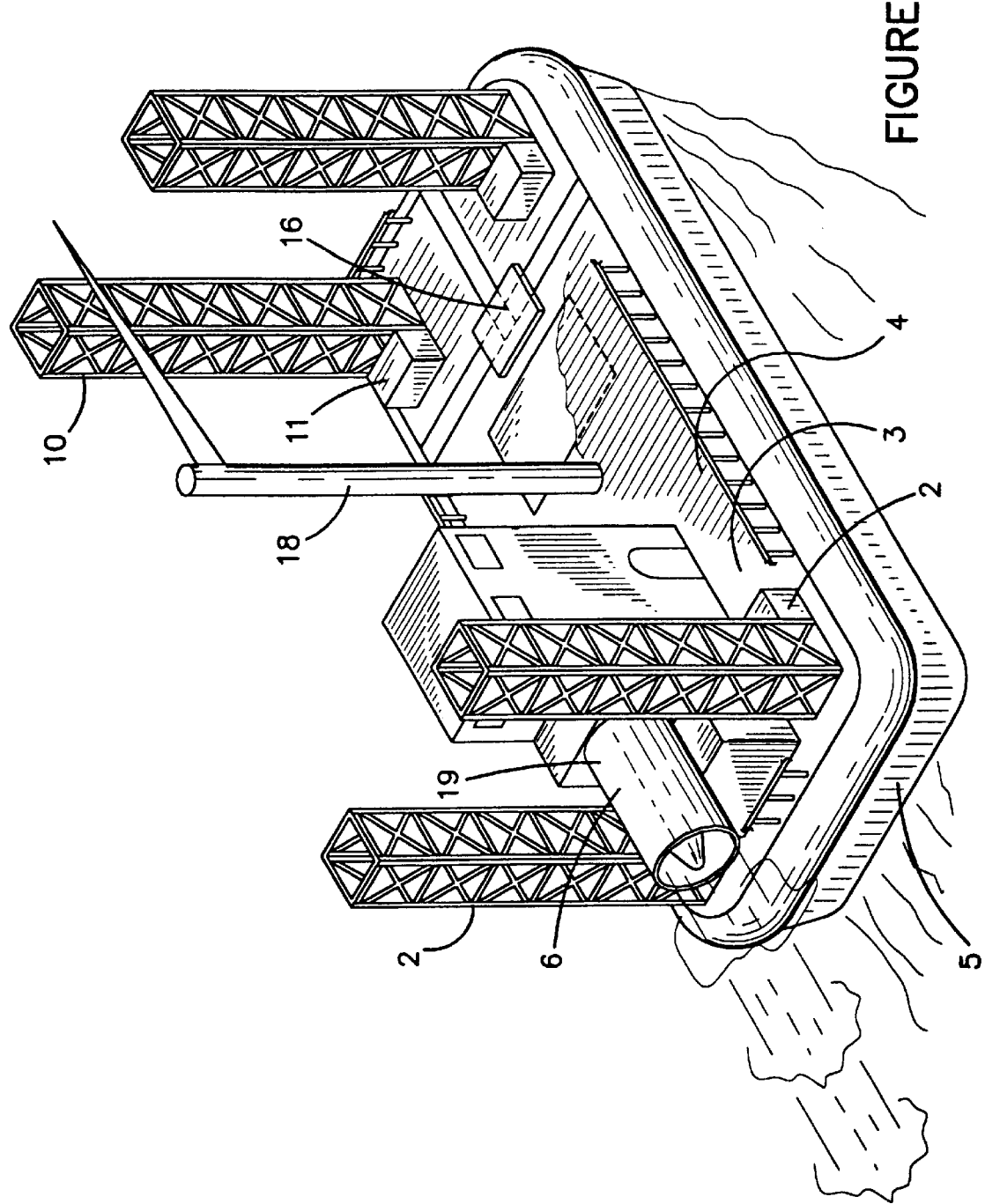
FIG. 1 is a perspective view of the hovercraft work platform with its jack-up structure in the travel position.
Figure 2:
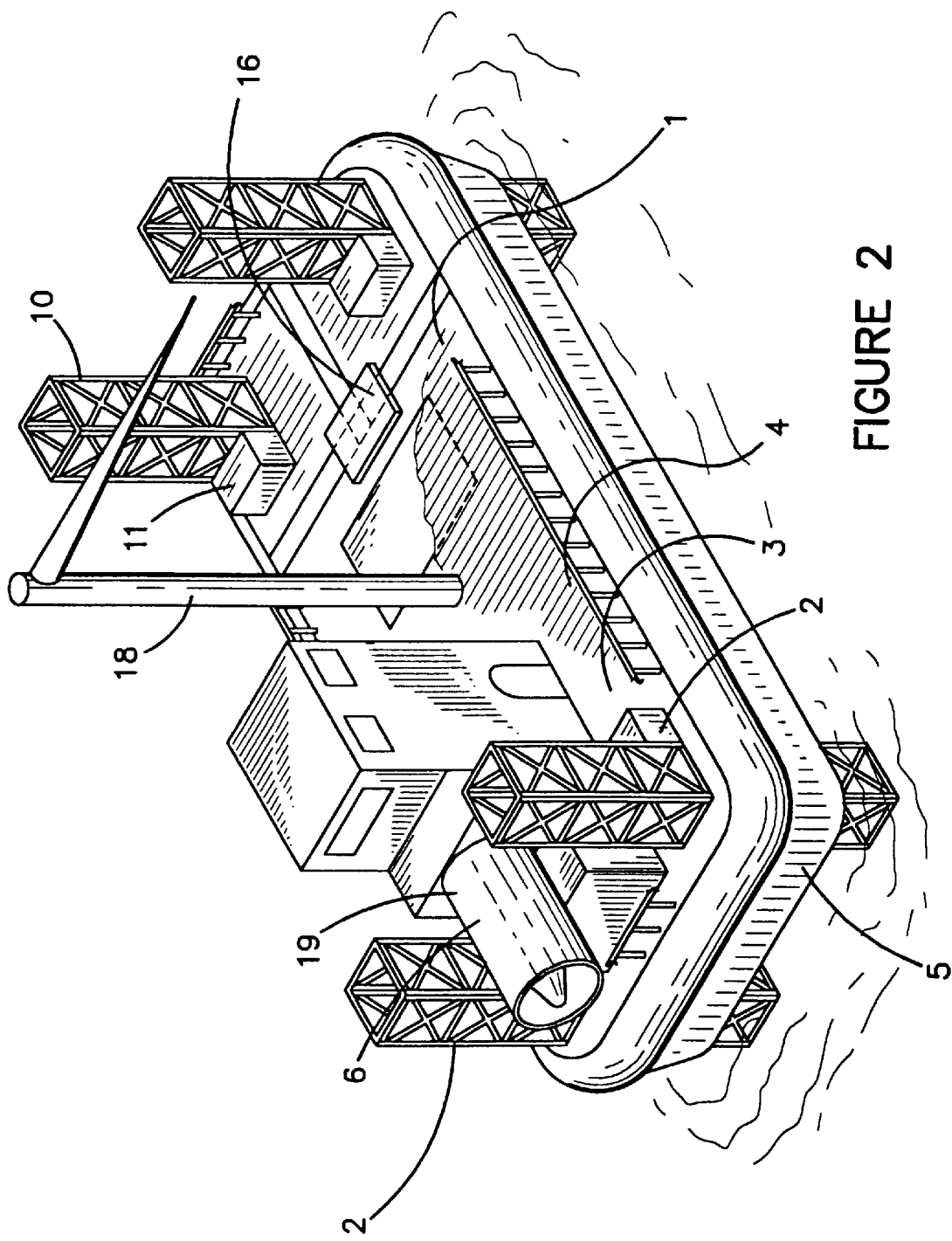
FIG. 2 is a perspective view of the hovercraft work platform with its jack-up structure raised, during jack-up.
Figure 3:
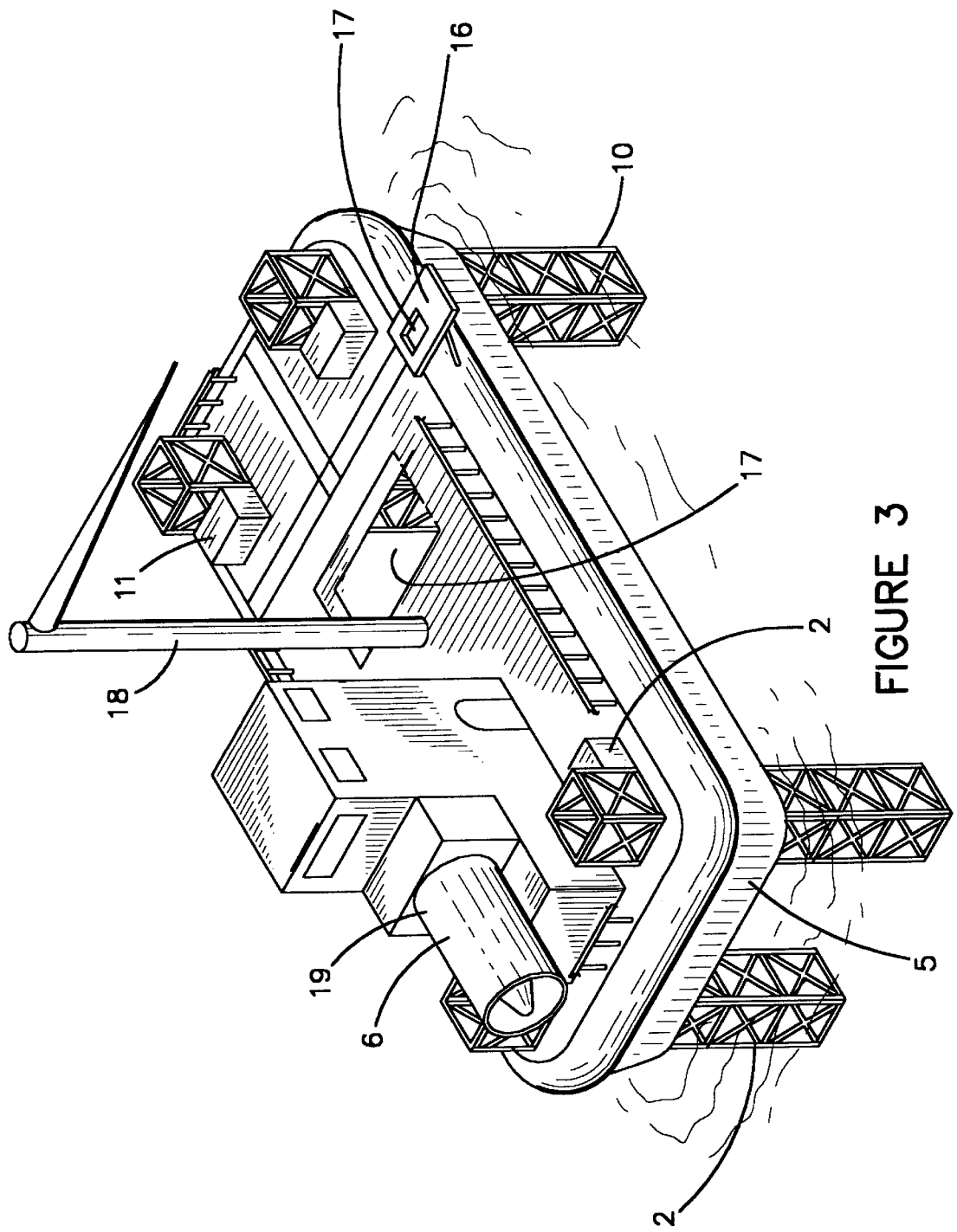
FIG. 3 is a perspective view of the hovercraft work platform fully raised on its jack-up structure, with a cantilever drilling platform extended and a drilling aperture opened.

The invention comprises a hovercraft 1 combined with a jack-up structure 2. Hovercraft 1 will have a hull and a deck 3 which may serve as a work platform 4 from which oil exploration and production operations can be conducted. Below deck 3 is a skirt 5 which forms a perimeter around hovercraft 1. Skirt 5 may be a bag or tube skirt, a segmented or finger skirt, a jupe or cell skirt, or other such skirt designs as may prove convenient, and will preferably be made of a heavy rubberized fabric. Air is pumped into skirt 5 to create an air cushion on which hovercraft 1 floats. Air source 6 will typically comprise one or more jet engines, diesel turbines, gas turbines or other such conventional engines. A portion of the air from air source 6 will be directed into skirt 5 which will inflate the skirt components, creating a boundary for the air cushion. A second and typically greater portion of the air from air source 6 will be directed into the space below deck 3 defined by skirt 5. This air forms the air cushion on which hovercraft 1 rests.

Once hovercraft 1 is floating on its air cushion, it may be moved by providing thrust from a thrust source 19. Thrust source 19 may comprise the same engine or engines that serve as air source 6. Alternatively, separate engines or groups of engines may be provided for thrust and lift. However the engines are configured, they provide thrust to hovercraft 1 which moves it forward similar to the way that an aircraft is propelled by its engines.

Hovercraft 1 is preferably provided with all the standard equipment typically found on a jack-up drilling rig and particularly including a crane 18 and a jack up structure 2. Jack up structure 2 comprises a plurality of legs 10 and a plurality of jack houses 11. There are preferably three to four jack houses 11 on hovercraft 1. Jack houses 11 contain the mechanism for lowering legs 10 to the sea or marsh floor and for lifting hover craft 1 on legs 10. Jack houses 11 may be positioned on deck 3, preferably at its corners. In this embodiment, deck 3 should be provided with openable leg apertures to allow legs 10 to pass through deck 3. Alternatively, jack houses 11 may extend beyond deck 3 so that legs 10 may be lowered without having to pass through deck 3.

Jack houses 11 should preferably contain at least one motor 12 associated with at least one set of reduction gears. These gears will drive, preferably via a shaft, an output pinion 13. Legs 10, which may have a cross section that is triangular, square, rectangular, circular, or any other convenient shape, should be provided with a plurality of teeth 14 preferably running along the length of legs 10. Teeth 14 will form racks 15 that should sized to engage output pinion 13.

Motors 12 will brake each leg 10 against gravity as it is lowered to the sea or marsh bed. The bottom end of legs 10 may be provided with a foot sized to inhibit leg 10 from sinking into the bed. Once all legs 10 have been lowered to the point where they are resting on the sea or marsh bed, motors 12 will be used to raise hovercraft 1 on legs 10 until it reaches the desired height, which will vary depending upon the application. It may be desirable to cease jacking when hovercraft 1 has been raised above its normal flotation position only slightly, so that legs 10 will hold hovercraft 1 in place, but the water will still support much of its weight. On the other hand, when hovercraft 1 is used to work on objects above the waterline such as other rigs, hovercraft 1 will need to be raised to a sufficient height to reach the rig. If hovercraft 1 is used in places where significant wave action is expected, it will typically need to be higher than the height of the tallest expected waves for the area. Once in the desired height, hovercraft 1 may be chocked in place or otherwise secured directly to legs 10 in order to remove tension from motors 12. Legs 10 should be of a size and strength to support the weight of hovercraft 1 and its attendant equipment and crew. Legs 10 should preferably be made of a strong corrosion resistant material such a stainless steel or mild steel provided with a conventional corrosion protector or inhibitor. The inventor contemplates that the jack up structure of the type used on the Gorilla V jack-up rig owned by Rowan Companies, Inc. of Houston Tex. (USA) and manufactured by LeToumeau, Inc. of Vicksburg, Miss. (USA) to be more than sufficient to satisfy the objectives of the present invention.

Once hovercraft 1 is raised to the desired height, deck 3 will serve as a work platform 4. Deck 3 may be provided with a drilling aperture 17 which can be opened to allow drill stem to pass through deck 3 to the water and below. Drilling aperture 17 may have other uses besides drilling such as providing an entry and exit point into the water for divers and submersible craft. Drilling aperture 17 should preferable be closeable, in order to allow that portion of deck 3 containing to drilling aperture 17 to be used as work platform 4.

Alternatively or in addition to drilling aperture 17, hovercraft 1 may be provided with a work platform extension 16. Work platform extension 16 may be cantilevered beyond the edge of deck 3. In this embodiment, work platform extension 16 will preferably contain a drilling aperture 17 through which drill stem may pass to the water and below without having to go through deck 3, although drilling operations may extend over the side of work platform extension 16 or deck 3 for that matter. Drilling does not have to be conducted through deck 3 or extension 16. When work platform extension 16 is used for drilling, a drilling rig (not shown) will be positioned on extension 16. This will typically be a platform type rig which would be positioned with crane 18 or a truck mounted rig which could driven into place.

Work platform extension 16 is preferably positionable at several different sides of deck 3, allowing work to be conducted where desired. Work platform 4 or work platform extension 16 can be used to conduct a variety of oil field services including: geological surveying with explosive charges and the like; drilling (directional and conventional); production; rig work over; and service work to other rigs and structures.

It is anticipated that the foregoing description of the inventor's preferred embodiments will make other embodiments apparent to those skilled in the art. The following claims are intended to have a scope sufficient to reach such additional embodiments as well as those embodiments explicitly described above.

I claim:

1. A jack up work platform comprising:
    a hovercraft vessel comprising a deck capable of serving as a work platform, a skirt positioned below said deck, said skirt configured to contain an air cushion sufficient to support said hovercraft, an air source capable of directing a sufficient volume of air into said skirt to create said air cushion, and a thrust source capable of generating sufficient thrust to move said hovercraft; and
    a jack up structure comprising a plurality of extensible legs of sufficient size and strength to support said hovercraft.

2. A jack up work platform according to claim 1 further comprising a plurality of jack houses, each said jack house operatively engaged with at least one of said extensible legs.

3. A jack up work platform according to claim 2 wherein said legs contain a plurality of teeth extending along the length of said legs, said teeth forming racks.

4. A jack up work platform according to claim 3 wherein said jack houses further comprise a motor configured to drive an output pinion, said pinion operatively engaged with said racks of said legs, whereby said legs may be extended by operation of said motor.

5. A jack up work platform according to claim 1 wherein said deck is provided with a drilling aperture.

6. A jack up work platform according to claim 1 further comprising a work platform extension cantilevered from said deck.

7. A jack up work platform according to claim 6 wherein said work platform extension is provided with a drilling aperture.

8. A jack up work platform according to claim 1 wherein said work platform further comprises a crane.

9. A jack up work platform according to claim 1 wherein said thrust source and said air source comprise a single engine.

10. A jack up work platform according to claim 1 wherein said thrust source and said air source comprise a plurality of engines.

11. A self-propelled jack-up work platform comprising:
a hovercraft vessel comprising a deck capable of serving as a work platform, a skirt positioned below said deck, said skirt configured to contain an air cushion sufficient to support said hovercraft, an air source capable of directing a sufficient volume of air into said skirt to create said air cushion, and a thrust source capable of generating sufficient thrust to move said hovercraft; and
a jack up structure comprising a plurality of extensible legs of sufficient size and strength to support said hovercraft.

12. A jack-up work platform comprising:
a hovercraft vessel comprising a deck capable of serving as a work platform, a skirt positioned below said deck, said skirt having a bottom edge opposite said deck, said skirt configured to contain an air cushion sufficient to support said hovercraft, an air source capable of directing a sufficient volume of air into said skirt to create said air cushion, and a thrust source capable of generating sufficient thrust to move said hovercraft; and
a jack up structure comprising a plurality of extensible legs of sufficient size and strength to support said hovercraft, wherein said legs are long enough to extend beyond said bottom edge of said skirt when said legs are extended.

13. A jack up work platform comprising:
a hovercraft vessel comprising a deck capable of serving as a work platform, a skirt positioned below said deck, said skirt configured to contain an air cushion sufficient to support said hovercraft, an air source capable of directing a sufficient volume of air into said skirt to create said air cushion, and a thrust source capable of generating sufficient thrust to move said hovercraft; and
a jack up structure comprising a plurality of extensible legs of sufficient size and strength to support said hovercraft said legs containing a plurality of teeth extending along the length of said legs, said teeth forming racks; and a plurality of jack houses, each said jack house operatively engaged with at least one of said extensible legs.

14. A jack up work platform according to claim 13 wherein said jack houses further comprise a motor configured to drive an output pinion, said pinion operatively engaged with said racks of said legs, whereby said legs may be extended by operation of said motor.

15. A jack up work platform comprising:
a hovercraft vessel comprising a deck capable of serving as a work platform, a skirt positioned below said deck, said skirt configured to contain an air cushion sufficient to support said hovercraft, an air source capable of directing a sufficient volume of air into said skirt to create said air cushion, and a thrust source capable of generating sufficient thrust to move said hovercraft; and
a jack up structure comprising a plurality of extensible legs configured rest upon a solid surface when fully extended and of sufficient size and strength to support said hovercraft.

\* \* \* \* \*